US011163513B2

(12) United States Patent
Sugiyama et al.

(10) Patent No.: US 11,163,513 B2
(45) Date of Patent: Nov. 2, 2021

(54) IMAGE FORMING APPARATUS, DATA COMMUNICATION METHOD

(71) Applicant: KYOCERA Document Solutions Inc., Osaka (JP)

(72) Inventors: Yuichi Sugiyama, Osaka (JP); Hideo Tanii, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 17/024,562

(22) Filed: Sep. 17, 2020

(65) Prior Publication Data

US 2021/0117142 A1 Apr. 22, 2021

(30) Foreign Application Priority Data

Sep. 19, 2019 (JP) ............... JP2019-170099

(51) Int. Cl.
*G06F 3/12* (2006.01)
(52) U.S. Cl.
CPC ............ *G06F 3/1294* (2013.01); *G06F 3/121* (2013.01); *G06F 3/1234* (2013.01)
(58) Field of Classification Search
None
See application file for complete search history.

(56) References Cited

U.S. PATENT DOCUMENTS

| 2003/0065685 A1 | 4/2003 | Belcaid et al. |
| 2003/0233496 A1 * | 12/2003 | Kawase ................. G06F 13/28 710/22 |
| 2005/0071730 A1 * | 3/2005 | Moyer ............. H03K 19/17764 714/758 |
| 2005/0172059 A1 | 8/2005 | Yoshimura et al. |
| 2010/0058155 A1 | 3/2010 | Wu |
| 2010/0211834 A1 * | 8/2010 | Asnaashari ......... G06F 11/1048 714/718 |

(Continued)

FOREIGN PATENT DOCUMENTS

| EP | 0578386 A2 | 1/1994 |
| JP | H0787161 A | 3/1995 |
| JP | 2005196486 A | 7/2005 |

*Primary Examiner* — Dov Popovici
(74) *Attorney, Agent, or Firm* — Alleman Hall Creasman & Tuttle LLP

(57) ABSTRACT

An image forming apparatus includes a first processor, a second processor, a data transfer portion, a consistency determination portion, an abnormality determination portion, a re-transfer control portion, and an abnormality processing portion. The data transfer portion transfers data via a bus between a storage medium and the second processor. The consistency determination portion determines whether or not there is consistency between data before and after a transfer by the data transfer portion. The abnormality determination portion, upon determination that there is consistency, determines whether or not there is abnormality in the data transfer process. The re-transfer control portion, upon determination that there is no consistency, causes the data transfer portion to re-transfer the data. The abnormality processing portion, upon determination that there is abnormality in the data transfer process, prohibits the re-transfer control portion from re-transferring the data, and executes an abnormality process to handle the abnormality.

8 Claims, 4 Drawing Sheets

(56) References Cited

U.S. PATENT DOCUMENTS

2013/0007412 A1    1/2013   Krishnamurthy et al.
2013/0054871 A1    2/2013   Lassa
2015/0015905 A1    1/2015   Tsunemi et al.
2021/0089254 A1*   3/2021   Tanii ........................ G06F 3/121

\* cited by examiner

IMAGE FORMING APPARATUS, DATA COMMUNICATION METHOD

INCORPORATION BY REFERENCE

This application is based upon and claims the benefit of priority from the corresponding Japanese Patent Application No. 2019-170099 filed on Sep. 19, 2019, the entire contents of which are incorporated herein by reference.

BACKGROUND

The present disclosure relates to an image forming apparatus and a data communication method for an image forming apparatus.

There is known a data communication apparatus configured to perform, via a serial bus, a data communication with slave devices connected with the serial bus, by changing a communication protocol of the data communication for each of the slave devices.

In addition, there is known an image forming apparatus that includes: a CPU mounted on a main control board of the image forming apparatus; an ASIC (Application Specific Integrated Circuit) configured to control a function portion such as an image forming portion; and a DMA (Direct Memory Access) controller configured to execute a data transfer process to transfer data between the CPU and the ASIC. The ASIC is connected with: a drive portion such as a motor included in the function portion; and a sensor configured to detect various states of the image forming apparatus. The ASIC is configured to control the drive portion based on an instruction from the CPU and acquire detection data that indicates a detection result of the sensor.

In the image forming apparatus, the CPU and the ASIC are connected with each other via the serial bus in a communicable manner. The CPU performs a communication with the ASIC and receives detection data acquired by the ASIC. In addition, the CPU performs a communication with the ASIC and transmits, to the ASIC, control data that is used to control the drive portion.

Conventionally, when the CPU and the ASIC perform a communication with each other to transfer data, they execute a consistency determination process to generate a checksum of the data and add the checksum to the data before the data is transferred, generate a checksum of the data after the transferred data is received, and compare the checksums generated before and after the transfer, thereby determining whether or not there is consistency between the data before and after the transfer.

In addition, there is known a method that, when a master control circuit of a master device receives an unauthorized address during a serial communication between the master device and a slave device, causes the operation state of a serial bus used in the serial communication to transit to an arbitrary state.

SUMMARY

An image forming apparatus according to an aspect of the present disclosure includes a first processor, a second processor, and a data transfer portion. The data transfer portion is connected with the first processor and the second processor via a bus in a communicable manner, and executes a data transfer process to transfer data via the bus between a storage medium connected with the bus and the second processor. The image forming apparatus further includes a consistency determination portion, an abnormality determination portion, a re-transfer control portion, and an abnormality processing portion. The consistency determination portion determines whether or not there is consistency between data before and after a transfer by the data transfer portion. The abnormality determination portion, after the consistency determination portion determines that there is consistency, determines whether or not there is abnormality in the data transfer process of the data. The re-transfer control portion, after the consistency determination portion determines that there is no consistency, causes the data transfer portion to re-transfer the data that is a transfer target. The abnormality processing portion, after the abnormality determination portion determines that there is abnormality in the data transfer process, prohibits the re-transfer control portion from re-transferring the data, and executes an abnormality process to handle the abnormality.

A data communication method according to another aspect of the present disclosure is executed in an image forming apparatus that includes a first processor, a second processor, and a data transfer portion connected with the first processor and the second processor via a bus in a communicable manner and configured to execute a data transfer process to transfer data via the bus between a storage medium connected with the bus and the second processor. The data communication method includes a consistency determination step, an abnormality determination step, a re-transfer control step, and an abnormality processing step. The consistency determination step determines whether or not there is consistency between data before and after a transfer by the data transfer portion. The abnormality determination step, after the consistency determination step determines that there is consistency, determines whether or not there is abnormality in the data transfer process of the data. The re-transfer control step, after the consistency determination step determines that there is no consistency, causes the data transfer portion to re-transfer the data that is a transfer target. The abnormality processing step, after the abnormality determination step determines that there is abnormality in the data transfer process, prohibits the re-transfer control step from re-transferring the data, and executes an abnormality process to handle the abnormality.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

The following describes an embodiment of the present disclosure with reference to the accompanying drawings. It should be noted that the following embodiment is an example of a specific embodiment of the present disclosure and should not limit the technical scope of the present disclosure.

Figure 1:
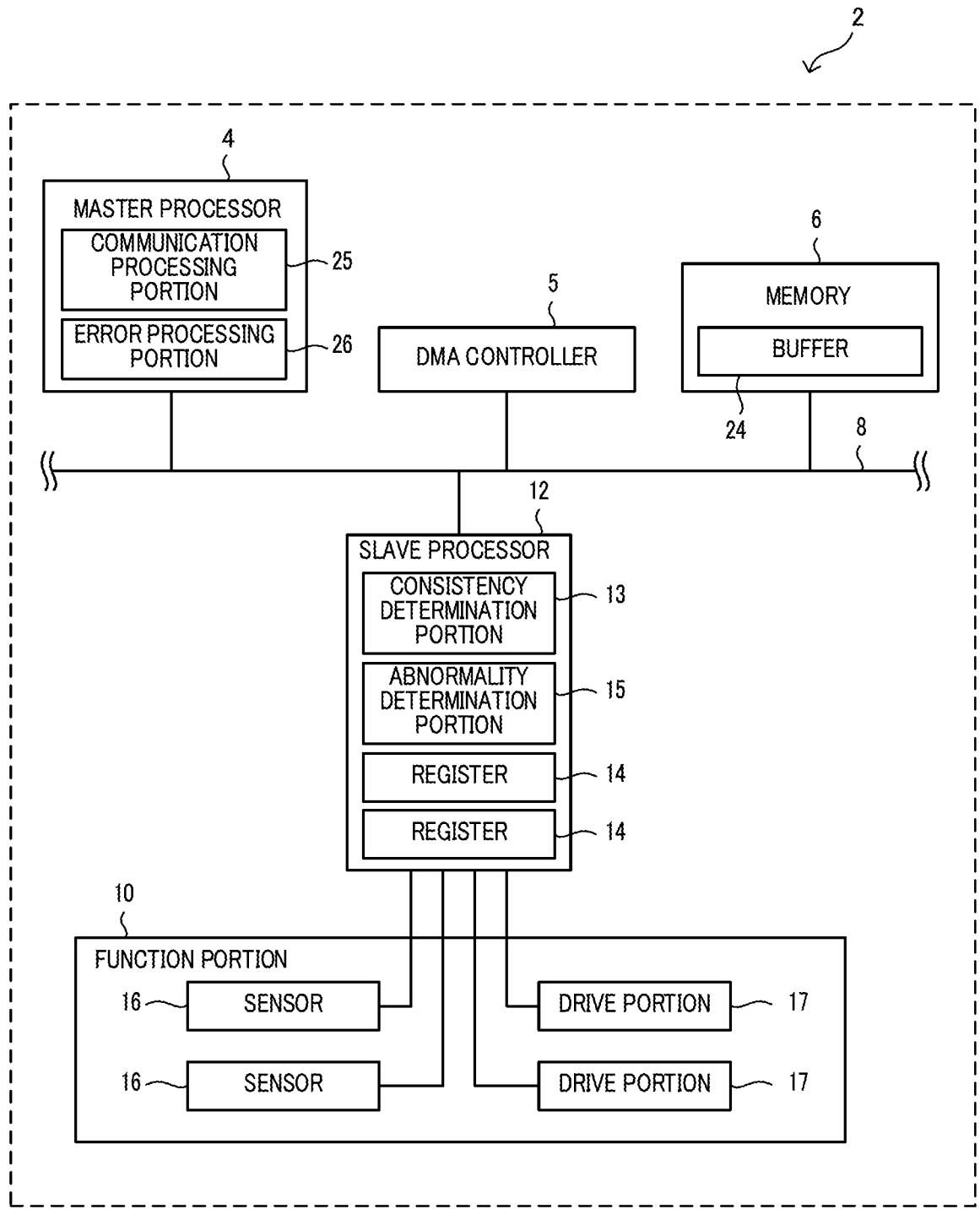
FIG. 1 is a diagram showing a configuration of an image forming apparatus according to an embodiment of the present disclosure.
Figure 2:
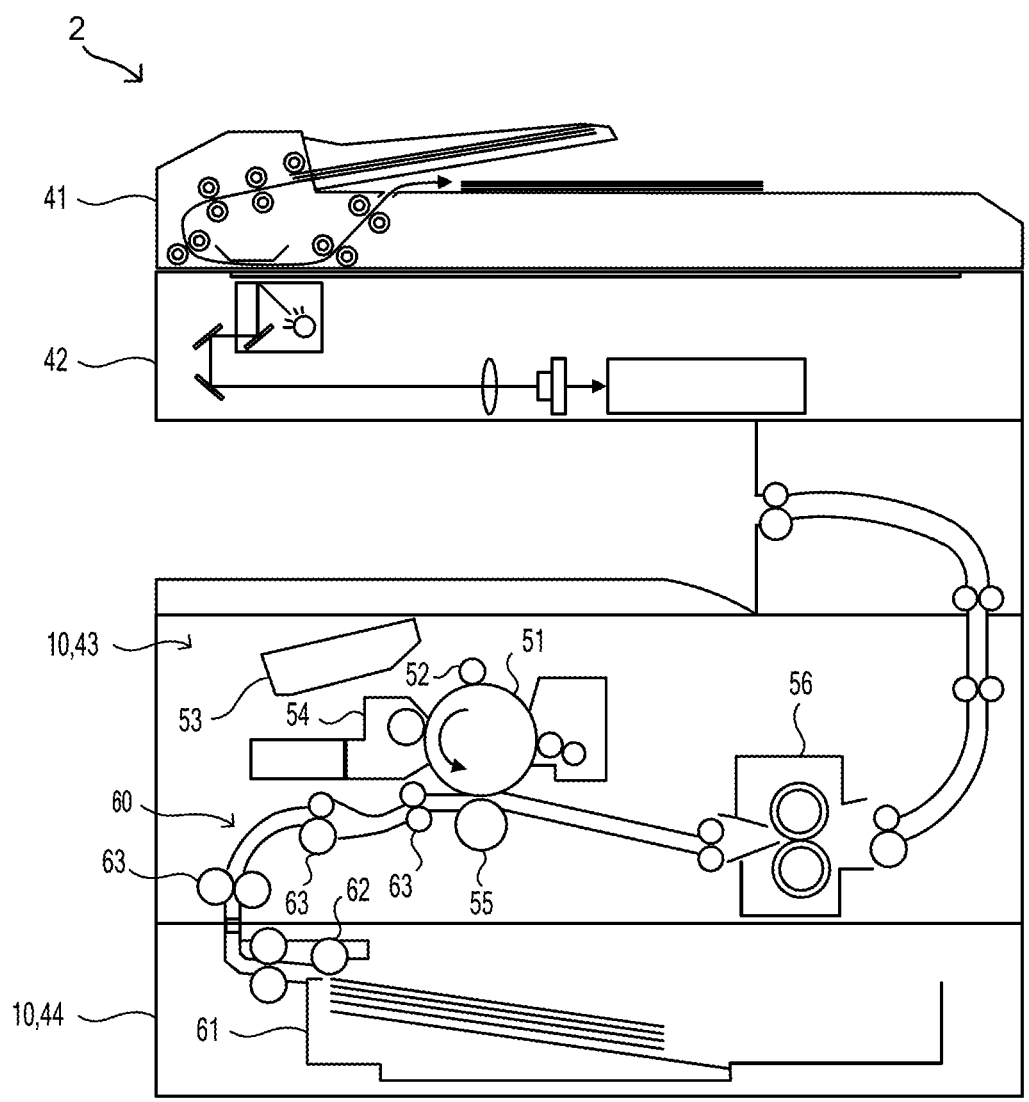
FIG. 2 is a diagram showing a configuration of the image forming apparatus according to the embodiment of the present disclosure.

A description is given of a configuration of an image forming apparatus 2 according to an embodiment of the present disclosure with reference to FIG. 1 and FIG. 2. FIG. 1 is a block diagram showing a configuration of the image forming apparatus 2. In addition, FIG. 2 is a schematic cross-sectional diagram showing a configuration of the image forming apparatus 2.

As shown in FIG. 1, the image forming apparatus 2 includes a master processor 4 (an example of a first processor of the present disclosure), a DMA (Direct Memory Access) controller 5 (an example of a data transfer portion of the present disclosure), a memory 6 (an example of a storage medium of the present disclosure), a serial data bus 8 (an example of a bus of the present disclosure), one or more function portions 10, and a slave processor 12 (an example of a second processor of the present disclosure). The master processor 4, the DMA controller 5, the memory 6, and the slave processor 12 are connected with each other in a communicable manner via the serial data bus 8. It is noted that the slave processor 12 is provided in correspondence with a function portion 10, and configured to detect a signal from a sensor 16 of the function portion 10 and control a drive portion 17 such as a motor. It is noted that in a case where a plurality of function portions 10 are provided, a plurality of slave processors 12 are provided in correspondence with the plurality of function portions 10.

The function portions 10 respectively execute a plurality of functions of the image forming apparatus 2. For example, the image forming apparatus 2 has an image forming function. In this case, the function portion 10 that executes the image forming function is, for example, an image forming portion 43 (see FIG. 2). In addition, the image forming apparatus 2 has a sheet feed function. In this case, the function portion 10 that executes the sheet feed function is, for example, a sheet feed portion 44 (see FIG. 2). It is noted that in the present embodiment, as described below, the image forming apparatus 2 has the image forming function and the sheet feed function, and the image forming apparatus 2 includes two function portions 10 (the image forming portion 43 and the sheet feed portion 44) in correspondence with the functions.

The image forming portion 43 is a specific example of the above-described function portions 10. The image forming portion 43 is configured to execute the image forming function, namely, a function to form an image on a sheet such as a print sheet by an electrophotographic method. As shown in FIG. 2, the image forming portion 43 includes a photoconductor drum 51, a charging device 52, an exposure device 53, a developing device 54, a transfer device 55, and a fixing device 56. The charging device 52 is configured to electrically charge the surface of the photoconductor drum 51 to a certain potential. The exposure device 53 is configured to irradiate laser light on the surface of the photoconductor drum 51 to expose it based on image data. The developing device 54 is configured to develop an electrostatic latent image that has been formed on the photoconductor drum 51 by the exposure device 53. The transfer device 55 is configured to transfer a toner image formed on the photoconductor drum 51 by the developing device 54 to the sheet. The fixing device 56 is configured to fix the toner image transferred to the sheet, to the sheet by heating and pressurizing the sheet.

The sheet feed portion 44 is a specific example of the above-described function portions 10. The sheet feed portion 44 is configured to execute the sheet feed function, namely, a function to feed a sheet to the image forming portion 43. As shown in FIG. 2, the sheet feed portion 44 includes a sheet feed cassette 61, a pick-up roller 62, and a plurality of conveyance rollers 63. The sheet feed cassette 61 stores sheets that are used in printing, and lifts the sheets up to a position where the sheets are contacted by the pick-up roller 62. The pick-up roller 62 conveys a sheet from the sheet feed cassette 61 to a conveyance path 60 formed inside the image forming apparatus 2. Each of the plurality of conveyance rollers 63 are provided in the conveyance path 60, and configured to convey a sheet along the conveyance path 60.

As shown in FIG. 1, each of the function portions 10 includes a plurality of drive portions 17 and a plurality of sensors 16 that correspond to the plurality of drive portions 17. It is noted that although the following describes an example case where the function portion 10 includes two drive portions 17 and two sensors 16, the function portion 10 may include three or more drive portions 17 and three or more sensors 16, or may include one drive portion 17 and one sensor 16.

For example, the plurality of drive portions 17 included in the image forming portion 43 are: a drum motor configured to cause the photoconductor drum 51 to rotate; and a heater provided in the fixing device 56. In addition, the plurality of sensors 16 included in the image forming portion 43 are: a rotary encoder configured to detect the number of rotations of the drum motor; and a temperature sensor configured to detect the temperature of the heater. The drive portions 17 provided in the image forming portion 43 are an example of a drive portion of the present disclosure.

In addition, the plurality of drive portions 17 included in the sheet feed portion 44 are: a lift motor to drive a lift plate that is provided on a bottom surface of the sheet feed cassette 61 and can be lifted up and down; and a clutch configured to switch between supplying and not supplying a rotational driving force to the pick-up roller 62. In addition, the plurality of sensors 16 included in the sheet feed portion 44 are: a sensor configured to detect the position of the lift plate; and a sensor configured to detect whether or not a sheet is present at a predetermined position in the conveyance path. The drive portions 17 provided in the sheet feed portion 44 are an example of a drive portion of the present disclosure.

It is noted that the sensors 16 may not correspond to the drive portions 17. The sensors 16 are not limited to the above-described ones, but may be, for example, a sensor configured to detect whether a door or a cover provided in the image forming apparatus 2 is opened or closed, a sensor configured to detect the attachment state of the sheet feed cassette 61, and a sensor configured to detect whether or not a sheet is being conveyed in the conveyance path 60.

It is noted that the image forming apparatus 2 may include an image reading portion 42 (see FIG. 2) configured to execute an image reading function to read image data from a document sheet. In addition, the image forming apparatus 2 may include a document sheet conveying portion 41 (see FIG. 2) configured to execute a document sheet conveying function to convey a document sheet so that the document sheet is read by the image reading portion 42. In this case, the image reading portion 42 and the document sheet conveying portion 41 are specific examples of the above-described function portions 10.

The slave processor 12 is connected with the plurality of drive portions 17 and the plurality of sensors 16. Specifically, as shown in FIG. 1, the slave processor 12 is connected with the plurality of drive portions 17 and the plurality of sensors 16 that are included in the function portion 10. The slave processor 12 is configured to individually control the plurality of drive portions 17 connected with the slave processor 12 by outputting control data to the drive portions 17 under the control of the master processor 4. In addition, the slave processor 12 is configured to acquire, from each of the plurality of sensors 16 connected with the slave processor 12, detection data that indicate detection results of the sensors 16. The slave processor 12 is, for example, an ASIC (Application Specific Integrated Circuit).

The slave processor 12 includes a consistency determination portion 13, an abnormality determination portion 15, and a plurality of registers 14 that are described below. The plurality of registers 14 are respectively assigned register addresses. The plurality of registers 14 correspond to the plurality of drive portions 17 connected with the slave processor 12. Each of the registers 14 is configured to store control data used to control a drive portion 17 that corresponds to that register 14. The slave processor 12 follows control data stored in a register 14 to control a drive portion 17 that corresponds to the control data.

In addition, the plurality of registers 14 correspond to the sensors 16 connected with the slave processor 12. Each of the registers 14 is configured to store detection data acquired by a sensor 16 that corresponds to that register 14. The detection data stored in the register 14 is transferred, by the DMA controller 5 described below, to a storage area having a predetermined address in the memory 6. After the detection data is transferred and stored in the storage area, the master processor 4 processes the detection data as necessary. It is noted that in a case where detection data is required to generate control data used to control a drive portion 17, the master processor 4 generates the control data as follows. That is, after a piece of detection data acquired by a sensor 16 is transferred to the memory 6, the master processor 4 generates a piece of control data used to control a drive portion 17 that corresponds to the sensor 16 by which the piece of detection data was acquired, based on the piece of detection data.

The memory 6 is configured to store various types of data. For example, the memory 6 is a semiconductor memory such as a RAM (Random Access Memory) or a flash memory. The memory 6 is configured to store control data that is transmitted to the slave processor 12. In addition, the memory 6 is configured to store detection data received from the slave processor 12.

The DMA controller 5 is configured to execute a data transfer process between the memory 6 and the slave processor 12 via the serial data bus 8 under the control of the master processor 4. Specifically, the DMA controller 5 executes the data transfer process to transfer data between the memory 6 and the slave processor 12 via the serial data bus 8, in accordance with a transfer instruction from the master processor 4. The data transfer process includes a first data transfer process for transferring the control data stored in the memory 6 to the slave processor 12. In addition, the data transfer process includes a second data transfer process for transferring the detection data stored in the register 14 of the slave processor 12 to the memory 6.

As shown in FIG. 1, the memory 6 includes a buffer 24. Execution request data representing a request (data transfer request) to execute the data transfer process is stored in the buffer 24. For example, the execution request data includes identification information for identifying transfer target data, a command for the transfer target data, transfer source information indicating a transfer source of the transfer target data (address information), transfer destination information indicating a transfer destination of the transfer target data (address information), and data amount information indicating the size (a data amount, a data size) of the transfer target data. The transfer source information is address information that indicates a storage area in the memory 6 in which the transfer target data is stored. The transfer destination information is address information that indicates a storage area in a storage medium of the transfer destination device in which the transferred transfer target data is stored.

The buffer 24 has a storage capacity sufficient to store a plurality of pieces of execution request data. In the image forming apparatus 2, when execution request data is generated during an operation of the image forming apparatus 2, the execution request data is collected in the buffer 24.

For example, execution request data representing a request to execute the first transfer process (first execution request data) includes: transfer source information indicating a memory address in which the control data being the transfer target data is stored; a command for the control data; transfer destination information indicating a register address of a register in which the control data is written; and data amount information indicating the data amount of the control data.

In addition, execution request data representing a request to execute the second transfer process (second execution request data) includes: transfer source information indicating a register address in which the detection data being the transfer target data is stored; a command for the detection data; transfer destination information indicating a memory address in which the detection data is written; and data amount information indicating the data amount of the detection data.

It is noted that the execution request data may represent a request to execute a data transfer process in which a plurality of pieces of transfer target data are transferred in succession. That is, the execution request data may include a plurality of pieces of identification information, a plurality of commands, a plurality of pieces of transfer source information, a plurality of pieces of transfer destination information, and a plurality of pieces of data amount information. In addition, the buffer 24 may be provided outside the memory 6.

The master processor 4 executes a serial communication with a communication device connected with the serial data bus 8. Here, the serial communication is a communication method of an electric communication in which serial data including transfer target data is transmitted on a transmission path one bit by one bit in a serial manner. The master processor 4 executes the serial communication in accordance with a communication protocol set in the image forming apparatus 2. The master processor 4 is, for example, a CPU (Central Processing Unit).

The master processor 4 executes the serial communication with the slave processor 12 via the DMA controller 5 based on the execution request data stored in the buffer 24. It is noted that although in the present embodiment, the master processor 4 and the DMA controller 5 are provided as individual components, the master processor 4, for example, may have a data transfer function (a data transfer portion) to execute the data transfer as the DMA controller 5 does. In this case, the master processor 4 itself executes the serial communication with the slave processor 12, and executes the data transfer process between the memory 6 and the slave processor 12.

Figure 3:
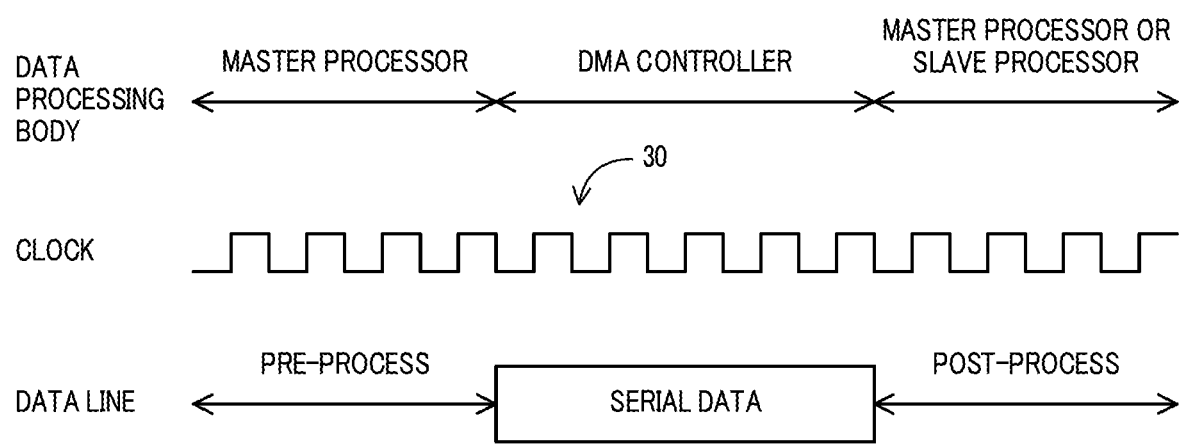
FIG. 3 is a diagram showing a processing procedure of a serial communication executed in the image forming apparatus according to the embodiment of the present disclosure.

Here, a processing procedure of the serial communication executed in the image forming apparatus 2 is described with reference to FIG. 3. FIG. 3 shows a processing procedure of the serial communication executed in the image forming apparatus 2, with indication of the data processing body and a clock 30.

The master processor 4 monitors the buffer 24, and upon detection of the execution request data stored in the buffer 24, executes a serial communication based on the detected execution request data. As shown in FIG. 3, before executing the serial communication, the master processor 4 executes a pre-process corresponding to the serial communication. In the pre-process, control information formed based on the communication protocol set in the image forming apparatus 2, is added to the transfer target data to be transferred in the serial communication. For example, the control information includes the identification information, the command, the transfer destination information (address information), and the data amount information of the transfer target data that are included in the execution request data.

In addition, as described below, when the first transfer process is executed to transfer the control data stored in the memory 6 to the slave processor 12, the control information further includes a checksum (an example of an inherent value of the present disclosure) of the serial data that includes the control data. In other words, when the execution request data stored in the buffer 24 is used to execute the first transfer process, the control information further includes a checksum of the serial data that is transferred. That is, in this case, the checksum is added to the transfer target data (the control data).

On the other hand, when the second transfer process is executed to transfer the detection data stored in the registers 14 of the slave processor 12 to the memory 6, the control information is transmitted to the slave processor 12 before the data transfer process. Upon receiving the execution request data, the slave processor 12 reads the detection data that is the transfer target data based on the transfer source information in the control information, and adds the control information to the detection data. The control information at this time does not include the checksum of the serial data that is transferred. In other words, when the execution request data stored in the buffer 24 is used to execute the second transfer process, the control information does not include the checksum. That is, in this case, the checksum is not added to the transfer target data (the detection data).

The command includes an instruction for the transfer destination device. The address information indicates a transfer destination or a storage destination of the transfer target data. The data amount information indicates a data amount of the transfer target data. Both the address information and the data amount information are included in the execution request data.

The checksum includes an error detection code used for the error detection. That is, the checksum is used to confirm that there is consistency between the transfer target data before and after communication. In the present embodiment, the checksum is an inherent value of the serial data that includes the control data transferred in the first transfer process. The checksum is generated in a checksum generating process that is executed by the master processor 4 before the control data being the transfer target data is transferred. The checksum is also generated in a checksum generating process that is executed by the slave processor 12 after the control data is transferred. Specifically, the master processor 4 and the slave processor 12 generate the checksum of the serial data by dividing the serial data including the control data into a plurality of predetermined blocks, and encoding the blocks and adding the encoded blocks.

In the serial communication, the serial data that includes the control information and the transfer target data is transferred. It is noted that the pre-process may include a process to put a preamble and a postamble into the serial data. For example, the preamble is a delimiter bit sequence that is arranged at the head of the serial data in the serial communication. In addition, the postamble is a delimiter bit sequence that is arranged at the end of the serial data.

After completion of the pre-process, the master processor 4 instructs the DMA controller 5 to execute the data transfer process based on the execution request data. This allows, as shown in FIG. 3, the DMA controller 5 to execute the data transfer process, namely, a DMA transfer in synchronization with the clock 30 generated by the master processor 4. Specifically, upon receiving the instruction from the master processor 4, the DMA controller 5 transfers the serial data from the transfer source device to the transfer destination device. It is noted that after instructing the execution of the data transfer process, the master processor 4 is released until the data transfer process ends.

As shown in FIG. 3, after the data transfer process by the DMA controller 5 ends, a post-process corresponding to the data transfer process is executed. The post-process is executed by the master processor 4 or the slave processor 12 based on the communication protocol set in the image forming apparatus 2. The post-process includes, for example: a consistency determination process in which to determine whether or not there is consistency between the transfer target data before and after communication; a transfer abnormality determination process in which to determine whether or not there is abnormality in the data transfer process of the received transfer target data; and a response signal process in which a response signal that indicates reception of the transfer target data is transmitted and received between two parties.

In the consistency determination process, it is determined whether or not there is consistency between data before and after a transfer by the DMA controller 5. Specifically, in the consistency determination process, a checksum (pre-transfer checksum) that is generated and added to serial data before the serial data is transferred, is compared with a checksum (post-transfer checksum) that is generated by a transfer destination device after the serial data is transferred thereto. Then it is determined that there is consistency when the pre-transfer checksum matches the post-transfer checksum, and it is determined that there is no consistency when the pre-transfer checksum does not match the post-transfer checksum.

In the present embodiment, as described below, the consistency determination process is executed when the first transfer process is executed to transfer the control data to the slave processor 12. On the other hand, when the second transfer process is executed to transfer the detection data to the memory 6, the consistency determination process is not executed, and the checksum generating process is not executed before and after the data transfer process.

After it is determined in the consistency determination process that there is consistency, the transfer abnormality determination process is executed to determine whether or not there is abnormality in the data transfer process of the transfer target data. Specifically, in the transfer abnormality determination process, it is determined whether or not there is abnormality in the data transfer process of the transfer target data based on the control information (an example of related information of the present disclosure) related to transferring of the transfer target data.

For example, when the control information includes the data amount information indicating the data amount of the transfer target data, the data amount information is compared with a predetermined reference data amount (an example of a reference value of the present disclosure), and it is determined that there is abnormality in the data transfer process when the data amount information is different from the reference data amount. In addition, when the control information includes the address information indicating an address of a storage medium in which the transfer target data is stored, the address information is compared with a predetermined default address information (an example of the reference value of the present disclosure), and it is determined that there is abnormality in the data transfer process when the address information is different from the default address information.

After the post-process, the transfer destination device writes the transfer target data to a specified address in accordance with the command or the transfer destination information included in the received serial data.

Meanwhile, in a case where the consistency determination process is executed each time the data transfer process is executed, the master processor 4 needs to execute, for each data transfer process, the checksum generating process and the consistency determination process, wherein in the checksum generating process, the checksum of the serial data including the transfer target data is generated. In this case, the master processor 4 needs to execute the checksum generating process in the pre-process that is executed before the data transfer process is executed and in the post-process that is executed after the data transfer process is executed, and the master processor 4 needs to execute the consistency determination process after the post-process is executed. The master processor 4 needs to use its resources to perform these processes. As a result, this increases the load of the master processor 4.

In addition, even in a case where data is transferred to an address that is different from the default address in the data transfer process between the master processor 4 and the slave processor 12, the data transfer process might be treated as a proper one if the checksums before and after the transfer match each other. Here, it would be possible for the master processor 4 to always monitor and compare data during communication to determine whether or not the data transfer process is performed properly. In that case, however, the master processor 4 needs to use its resources to perform the determination process. As a result, this increases the load of the calculation process of the master processor 4.

On the other hand, in the present embodiment, it is possible to reduce the load of the master processor 4 or the slave processor 12 in the data transfer, and even when an unauthorized data transfer process is performed, it is possible the detect the abnormality of the process in a reliable manner without increasing the load of the processors.

As shown in FIG. 1, the master processor 4 includes a communication processing portion 25 (an example of a re-transfer control portion of the present disclosure) and an error processing portion 26 (an example of an abnormality processing portion of the present disclosure). In addition, the slave processor 12 includes a consistency determination portion 13 (an example of a consistency determination portion of the present disclosure) and an abnormality determination portion 15 (an example of an abnormality determination portion of the present disclosure).

The master processor 4 and the slave processor 12 execute a communication control program stored in a ROM (not shown). This allows the master processor 4 to function as the communication processing portion 25 and the error processing portion 26, and the slave processor 12 to function as the consistency determination portion 13 and the abnormality determination portion 15. It is noted that the communication control program may be recorded on a non-transitory computer-readable recording medium such as a CD, a DVD, or a flash memory, and may be read from the recording medium and installed in a nonvolatile storage device provided in the image forming apparatus 2.

The communication processing portion 25 executes: a first communication process to transmit the control data from the memory 6 to the slave processor 12; and a second communication process to transmit the detection data acquired by the slave processor 12, from the slave processor 12 to the memory 6. Here, the first communication process and the second communication process include: the pre-process executed before the data transfer process is executed by the DMA controller 5; a process (execution instruction process) to cause the DMA controller 5 to execute the data transfer process; and the post-process executed after the data transfer process is executed by the DMA controller 5.

The communication processing portion 25 monitors the buffer 24, and when the execution request data is stored in the buffer 24, executes a serial communication with the first communication process or the second communication process based on the execution request data.

Specifically, the communication processing portion 25 consults the execution request data, and determines that the execution request data is the first execution request data when it detects that the execution request data includes identification information of the control data as the transfer target, wherein the first execution request data represents a request to execute the first communication process (including the first transfer process). In this case, the communication processing portion 25 determines whether or not the control data is stored in a storage area of the memory 6 indicated by the transfer source information (address information) included in the execution request data. Upon determining that the control data is stored in the memory 6, the communication processing portion 25 executes the first communication process.

Similarly, the communication processing portion 25 consults the execution request data, and determines that the execution request data is the second execution request data when it detects that the execution request data includes identification information of the detection data as the transfer target, wherein the second execution request data represents a request to execute the second communication process (including the second transfer process). In this case, the communication processing portion 25 determines whether or not the detection data is stored in a storage area of the register 14 indicated by the transfer source information (address information) included in the execution request data. Upon determining that the detection data is stored in the register 14, the communication processing portion 25 executes the second communication process.

In addition, the communication processing portion 25 determines that an abnormal communication has occurred when the consistency determination portion 13 determines that there is no consistency, and executes again the communication process that was determined that there is no consistency. Specifically, upon receiving, from the slave processor 12, inconsistency information that indicates that the consistency determination portion 13 has determined that there is no consistency, the communication processing portion 25 re-transfers the transfer target data. The inconsistency information is described below. In this case, the data that was determined as not having consistency by the slave processor 12, is deleted by the slave processor 12.

The consistency determination portion 13 is configured to, when a predetermined condition is satisfied, execute the consistency determination process to determine whether or not there is consistency between data before and after a transfer by the DMA controller 5.

In the present embodiment, the consistency determination portion 13 executes the consistency determination process in a case where the communication processing portion 25 executes the first communication process, namely, in a case where the data transfer process is executed to transfer the control data. For example, the consistency determination portion 13 executes the consistency determination process in a case where the communication processing portion 25 determines that the control data or the identification information is stored in the memory 6. On the other hand, the consistency determination portion 13 does not execute the consistency determination process in a case where the communication processing portion 25 executes the second communication process, namely, in a case where the data transfer process is executed to transfer the detection data.

That is, the consistency determination portion 13 executes the consistency determination process in a case where the first transfer process is executed to transfer the control data from the memory 6 to the slave processor 12. In addition, the consistency determination portion 13 does not execute the consistency determination process and does not execute the checksum generating process before and after the data transfer process, in a case where the second transfer process is executed to transfer the detection data from the slave processor 12 to the memory 6.

Here, the control data is used to control the drive portions 17, and corresponds to first type data of the present disclosure. In addition, the detection data represents detection results of the sensors 16, and corresponds to second type data of the present disclosure. That is, the consistency determination portion 13 executes the consistency determination process in a case where the data type of the transfer target data is control type (first type) that is used to control the drive portions 17. In addition, the consistency determination portion 13 does not execute the consistency determination process in a case where the data type of the transfer target data is non-control type (second type) that is not used to control the drive portions 17.

The control data is used to drive the drive portions 17 so that the image forming operation or the sheet feed operation is executed. As a result, when the control data becomes inconsistent after a transfer due to influence of noise or the like, the image forming operation or the sheet feed operation may not be performed properly. In view of this, in the present embodiment, to prevent such a malfunction from occurring, when the transfer target data is the control data, the checksum generating process is executed before and after the transfer, and the consistency determination process is executed after the transfer, although a calculation load is applied to the master processor 4 and the slave processor 12.

On the other hand, the detection data is acquired by the slave processor 12 in succession every predetermined time period (for example, every several microseconds) from the sensors 16. With regard to the detection data that is acquired in succession, each piece of detection data does not necessarily be complete. For example, it is possible to obtain accurate detection data by removing extraordinary values (outliers) that have deviated from a predetermined threshold range, from a plurality of pieces of detection data that have been acquired in succession, and obtaining an average value of the remaining pieces of detection data. Alternatively, a most frequent value or a center value may be obtained as the accurate detection data from the plurality of pieces of detection data. In this way, the master processor 4 executes a process (a removal process) to remove detection data influenced by noise or the like from a plurality of pieces of detection data transferred from the slave processor 12 to the memory 6 in succession. Accordingly, if a piece of detection data becomes inconsistent after a transfer due to influence of noise or the like, the inconsistent piece of detection data is removed by the removal process. As a result, there is not much need to determine the consistency of the detection data. In view of this, in the present embodiment, when the transfer target data is the detection data, the checksum generating process is not executed before and after the transfer, and the consistency determination process is not executed, thereby reducing the calculation load that is applied to the master processor 4 and the slave processor 12.

When it is determined that the first communication process is executed, namely, the data transfer process is executed to transfer the control data, the master processor 4 executes, during the pre-process before the control data is transferred, the checksum generating process to generate the checksum of the control data (pre-transfer checksum). Subsequently, the master processor 4 generates the serial data by adding the control information that includes the pre-transfer checksum, to the control data that is the transfer target data. Thereafter, the serial data including the pre-transfer checksum and the control data is transferred to the slave processor 12 in the first transfer process by the DMA controller 5. After the slave processor 12 receives the serial data, the slave processor 12 executes, during the post-process after the control data is transferred, the checksum generating process to generate the checksum of the control data after the transfer (post-transfer checksum).

Thereafter, the consistency determination portion 13 compares the pre-transfer checksum included in the serial data received by the slave processor 12 with the post-transfer checksum generated after the transfer to the slave processor 12, and determines that there is consistency when the pre-transfer checksum matches the post-transfer checksum. On the other hand, the consistency determination portion 13 determines that there is no consistency when the pre-transfer checksum does not match the post-transfer checksum.

In addition, in a case where the control data is transferred, if a worker who performs maintenance work of the image forming apparatus 2 rewrites the communication control program of the master processor 4 by mistake, the data transfer process is not performed properly. In addition, the image forming apparatus 2 may be accessed from outside in an unauthorized manner, and the communication control program of the master processor 4 may be rewritten in an unauthorized manner. In that case, too, the data transfer process is not performed properly. For example, abnormal data transfer processes include a process to transfer the transfer target data (control data) to an address that is different from a predetermined default address, and a process to transfer the transfer target data (control data) for which the data amount information indicates a data amount that is different from a predetermined reference data amount. Even in a case where such an abnormal data transfer process is performed, the data transfer process might be treated as a proper transfer process if the checksum of the transfer target data is the same before and after the transfer. In view of this, in the present embodiment, the slave processor 12 includes the abnormality determination portion 15.

In addition, when the consistency determination portion 13 determines that there is no consistency, the slave processor 12 transmits, to the master processor 4, inconsistency information (error information) that indicates that there is no consistency.

When it is determined in the consistency determination process that there is consistency, the abnormality determination portion 15 executes the transfer abnormality determination process to determine whether or not there is abnormality in the data transfer process of the transfer target data.

In the present embodiment, the abnormality determination portion 15 determines whether or not there is abnormality in the data transfer process of the transfer target data based on the control information related to transferring of the transfer target data (an example of the related information of the present disclosure). For example, when the control information includes the data amount information that indicates the data amount of the transfer target data, the data amount information is compared with the reference data amount (an example of the reference value of the present disclosure), wherein it is determined that the data transfer process is proper when the data amount information matches the reference data amount, and it is determined that there is abnormality in the data transfer process when the data amount information does not match the reference data amount. In addition, when the control information includes the address information indicating an address of a storage medium in which the transfer target data is stored, the address information is compared with the default address information (an example of the reference value of the present disclosure), wherein it is determined that the data transfer process is proper when the address information matches the default address information, and it is determined that there is abnormality in the data transfer process when the address information does not match the default address information. It is noted that the reference data amount and the default address information are preliminarily stored in an internal memory of the slave processor 12 or the like.

In addition, when the abnormality determination portion 15 determines that there is abnormality in the data transfer process, the slave processor 12 transmits, to the master processor 4, transfer abnormality information (error information) that indicates that there is abnormality in the data transfer process.

When the abnormality determination portion 15 determines that there is abnormality in the data transfer process, the error processing portion 26 prohibits the communication processing portion 25 from re-transferring data, and executes an error process (abnormality process) to handle the abnormality. Specifically, upon receiving, from the slave processor 12, the transfer abnormality information that indicates that the abnormality determination portion 15 has determined that there is abnormality in the data transfer process, the error processing portion 26 executes a predetermined error process. The error process includes a process to display, on the display portion of the image forming apparatus 2, an error message that indicates that a serious communication error has occurred, and a process to stop various operations in the image forming apparatus 2.

[Communication Control Process]

Figure 4:
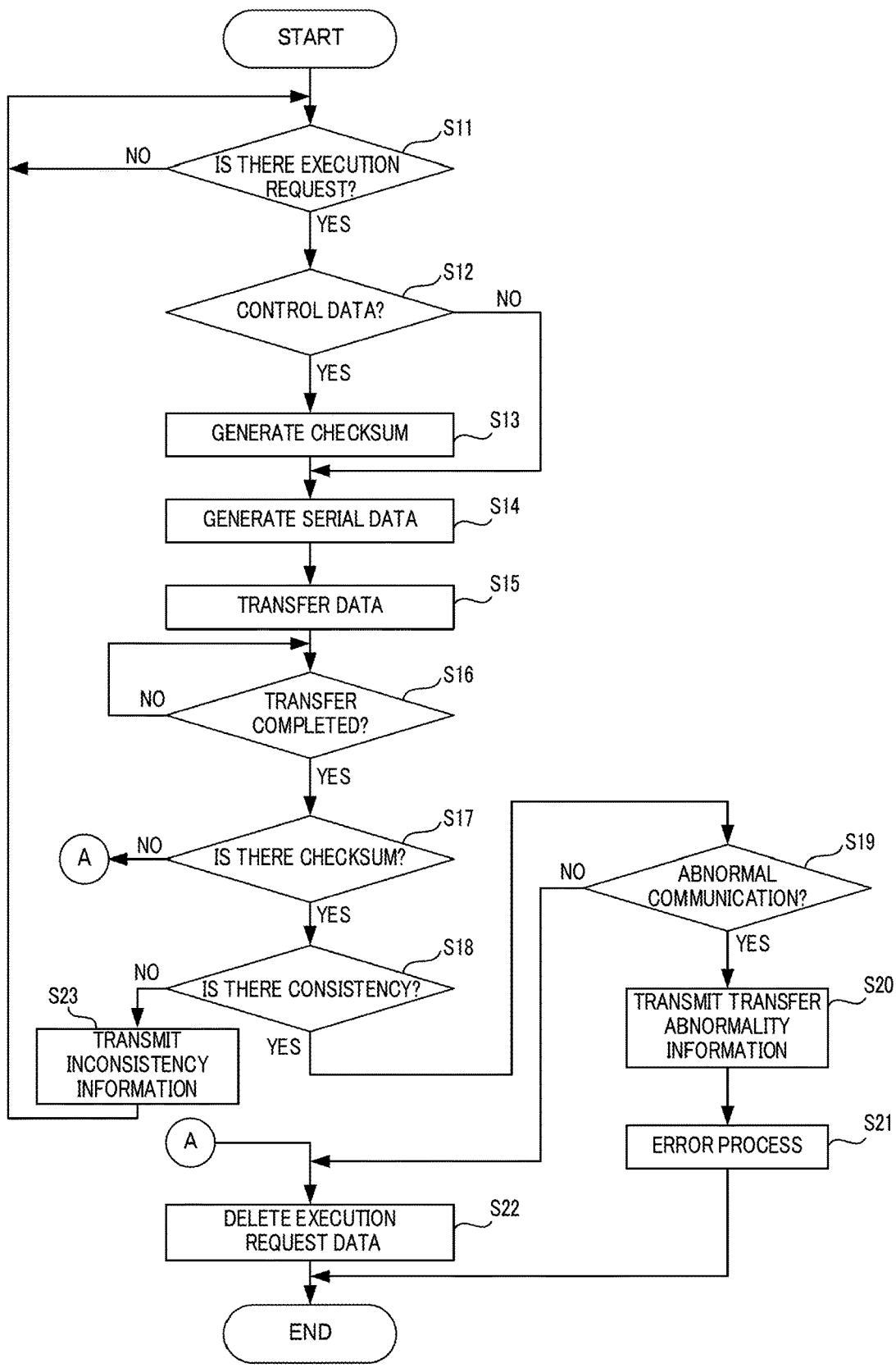
FIG. 4 is a flowchart showing an example of a communication control process executed in the image forming apparatus according to the embodiment of the present disclosure.

In the following, with reference to FIG. 4, a description is given of the procedure of the communication control process executed by the master processor 4 and the slave processor 12, and the data communication method of the present disclosure implemented in the communication control process. Here, steps S11, S12, . . . represent numbers assigned to the processing procedures (steps) executed by the master processor 4 and the slave processor 12. It is noted that in the communication control process, the processes of steps S12 to S14 correspond to the above-described pre-process, and the processes of steps S16 to S19 correspond to the above-described post-process. In addition, the communication control process is executed when the image forming function and the sheet feed function are executed in the image forming apparatus 2.

<Step S11>

First, in step S11, the master processor 4 determines whether or not there is a data transfer request. The master processor 4 monitors the buffer 24, determines that there is a data transfer request when execution request data has newly been stored in the buffer 24, and determines that there is no data transfer request when no execution request data has newly been stored in the buffer 24. Upon determining that there is a data transfer request (Yes at S11), the master processor 4 executes a serial communication in accordance with the procedures of step S12 and onward based on the execution request data stored in the buffer 24. On the other hand, upon determining that there is no data transfer request (No at S11), the master processor 4 waits for a data transfer request.

It is noted that the determination process of step S11 is not limited to the above-described example. For example, the DMA controller 5 may determine whether or not execution request data has newly been stored in the buffer 24, and notify the master processor 4 of the determination result so that the master processor 4 can determine whether or not there is a data transfer request.

<Step S12>

In step S12, the master processor 4 consults the execution request data and determines whether the transfer target data is the control data or other data (the detection data). In the present embodiment, the master processor 4 consults the execution request data and determines the data type of the transfer target data based on the identification information included in the execution request data. Specifically, the master processor 4 determines, based on the identification information included in the execution request data, whether the transfer target data is the control data of the control type or the detection data (non-control data) of the non-control type that is different from the control data. Here, when it is determined that the identification information indicating the control data is included in the execution request data (Yes at S12), the process goes to step S13, and when it is determined that the identification information indicating the control data is not included in the execution request data (No at S12), the process goes to step S14.

<Step S13>

When it is determined in step S12 that the transfer target data is the control data, in step S13, the master processor 4 generates the checksum of the control data (pre-transfer checksum) before the control data is transferred. The process then goes to step S14.

<Step S14>

In step S14, the master processor 4 performs a process to generate the serial data (see FIG. 3) that includes the control information and the transfer target data. Here, when the transfer target data is the control data, the pre-transfer checksum generated in step S13 is included in the control information, and serial data in which the control information including the pre-transfer checksum is added to the control data is generated. On the other hand, when the transfer target data is the detection data (non-control data), the master processor 4 transmits the control information to the slave processor 12, thereby allowing the slave processor 12 to generate serial data in which the control information is added to the detection data (non-control data).

<Step S15>

In step S15, the master processor 4 outputs a transfer instruction to the DMA controller 5. Upon receiving the transfer instruction, the DMA controller 5 executes the data transfer process to transfer the serial data between the memory 6 and the slave processor 12 via the serial data bus 8. The master processor 4 does not engage in the data transfer process. As a result, while the data transfer process is performed, the master processor 4 can perform a process other than the data transfer process.

<Step S16>

In step S16, the master processor 4 determines whether or not the data transfer process of step S15 is completed. After the serial data is transferred to the slave processor 12, the slave processor 12 transmits, to the master processor 4, a response signal indicating that it has received the serial data. The master processor 4 determines that the data transfer process is completed when it receives the response signal. In addition, when the serial data is transferred from the slave processor 12 to the memory 6, and the transfer is completed, the slave processor 12 transmits an end signal indicating that the transfer is completed. The master processor 4 determines that the data transfer process is completed when it receives the end signal.

<Step S17>

When it is determined that the data transfer process is completed, in step S17, the master processor 4 or the slave processor 12 that has received the data consults the control information in the serial data and determines whether or not the pre-transfer checksum is included in the control information. When the transfer target data is the control data, the slave processor 12 performs the determination process of step S17, and when the transfer target data is the detection data, the master processor 4 performs the determination process of step S17.

When it is determined in step S17 that the pre-transfer checksum is included in the control information (Yes at S17), the process goes to step S18 in which the slave processor 12 executes the above-described consistency determination process. On the other hand, when it is determined that the pre-transfer checksum is not included in the control information (No at S17), the process goes to step S22 in which the execution request data is deleted, and the consistency determination process is not executed.

It is noted that the determination process of step S17 is not limited to the above-described example. For example, the master processor 4 may determine that the pre-transfer checksum is included in the control information when it determines that the transfer target data in the serial data is the control data based on the identification information. On the other hand, it may be determined that the pre-transfer checksum is not included in the control information when it is determined that the transfer target data is the detection data based on the identification information.

<Step S18>

In step S18, the slave processor 12 executes the consistency determination process to determine whether or not there is consistency between the transfer target data before and after the data transfer process. That is, when the first transfer process is executed to transfer the control data to the slave processor 12, the slave processor 12 executes the consistency determination process. Step S18 is an example of a consistency determination step of the present disclosure.

Specifically, the slave processor 12 executes the checksum generating process to generate the checksum of the control data that has been transferred to the slave processor 12 (the post-transfer checksum). Subsequently, the slave processor 12 compares the pre-transfer checksum that had been generated and included in the serial data before the transfer was performed, with the post-transfer checksum generated by the slave processor 12. The slave processor 12 determines that there is consistency between the data before and after the transfer when the pre-transfer checksum matches the post-transfer checksum, and determines that there is no consistency when the pre-transfer checksum does not match the post-transfer checksum. When it is determined in step S18 that there is consistency between the data before and after the transfer, the process goes to step S19, and when it is determined that there is no consistency, the process goes to step S23.

<Step S23>

When it is determined in step S18 that there is no consistency, it means that the control data being the transfer target data was destroyed during a period including the transfer. As a result, in step S23, the slave processor 12 transmits, to the master processor 4, the inconsistency information that indicates that there is no consistency between the data before and after the transfer. Upon receiving the inconsistency information, the master processor 4 returns to step S11 to re-transfer the data, and the processes of step S11 and onward are repeated. It is noted that the step of returning from step S23 to step S11 to re-transfer the data is an example of a re-transfer control step of the present disclosure.

<Step S19>

When it is determined in step S18 that there is consistency between the data before and after the transfer, the slave processor 12 determines in step S19 whether or not there is abnormality in the data transfer process of step S15 based on the control information added to the transfer target data. In the present embodiment, the slave processor 12 compares the data amount information included in the control information with the above-described reference data amount, and determines that there is abnormality in the data transfer process when the data amount information does not match the reference data amount. In addition, the slave processor 12 determines that the data transfer process is normal when the data amount information matches the reference data amount. It is noted that step S19 is an example of an abnormality determination step of the present disclosure.

In addition, in step S19, the slave processor 12 compares the transfer destination information included in the control information with the above-described default address information, wherein the slave processor 12 determines that there is abnormality in the data transfer process when the transfer destination information does not match the default address information, and determines that the data transfer process is normal when the transfer destination information matches the default address information.

It is noted that in step S19, the slave processor 12 may determine that the data transfer process is normal when the data amount information matches the reference data amount and the transfer destination information matches the default address information, and otherwise, the slave processor 12 may determine that there is abnormality in the data transfer process.

When it is determined in step S19 that there is abnormality in the data transfer process, the process goes to step S20, and when it is determined that the data transfer process is normal, the process goes to step S22.

<Steps S20 to S21>

When it is determined in step S19 that there is abnormality in the data transfer process of step S15, it means that the transfer target data has not been destroyed, but it is not clear whether or not proper data is transferred. As a result, in step S20, the slave processor 12 transmits, to the master processor 4, the transfer abnormality information (error information) that indicates that there is abnormality in the data transfer process. Upon receiving the transfer abnormality information, the master processor 4 executes the error process in step S21. This ends the data communication process. It is noted that step S21 is an example of an abnormality processing step of the present disclosure.

<Step S22>

In step S22, the slave processor 12 transmits, to the master processor 4, a signal indicating that there is consistency, together with a command instructing to delete the execution request data. Upon receiving the command, the master processor 4 deletes the execution request data corresponding to the communication control process, from the buffer 24. In addition, when it is determined in step S17 that there is no checksum, the master processor 4 deletes the execution request data corresponding to the communication control process. This ends the data communication process.

As described above, in the image forming apparatus 2, only when the transfer target data is the control data, the checksum generating process is executed to generate the checksum of the control data, and the consistency determination process is executed, and when the transfer target data is the detection data, the checksum generating process and the consistency determination process are not executed. As a result, it is possible to reduce the load of the master processor 4 or the slave processor 12 because of the omission of the checksum generating process and the consistency determination process.

In addition, when the consistency determination portion 13 determines that there is consistency between data before and after a transfer, the abnormality determination portion 15 determines whether or not there is abnormality in the data transfer process, and when it is determined that there is abnormality in the data transfer process, the data is not re-transferred, and the above-described error process is executed. As a result, it is possible to detect an abnormality in the data transfer process in a reliable manner without increasing the load of the processors, while reducing the load of the processors.

It is noted that in the above-described embodiment, the consistency determination portion 13 is included in the consistency determination portion 13. However, not limited to this, for example, the consistency determination portion 13 may be included in the master processor 4. In this case, the master processor 4 executes the consistency determination process. As a result, the pre-transfer checksum generated before the transfer of the control data is stored in the register of the master processor 4, and the post-transfer checksum generated after the transfer of the control data is transferred from the slave processor 12 to the master processor 4.

In addition, in the above-described embodiment, the memory 6 is described as an example of the storage medium of the present disclosure, and in the data transfer process, data is transferred between the memory 6 and the slave processor 12. However, the present disclosure is not limited to the processing example. For example, the present disclosure is applicable to a data transfer process in which data is transferred between the register of the master processor 4 and the slave processor 12. In this case, the register of the master processor 4 is an example of the storage medium of the present disclosure.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An image forming apparatus comprising:
   a first processor;
   a second processor; and
   a data transfer portion connected with the first processor and the second processor via a bus in a communicable manner and configured to execute a data transfer process to transfer data via the bus between a storage medium connected with the bus and the second processor, the image forming apparatus further comprising:
   a consistency determination portion configured to determine whether or not there is consistency between data before and after a transfer by the data transfer portion;
   an abnormality determination portion configured to, after the consistency determination portion determines that there is consistency, determine whether or not there is abnormality in the data transfer process of the data;
   a re-transfer control portion configured to, after the consistency determination portion determines that there is no consistency, cause the data transfer portion to re-transfer the data that is a transfer target; and
   an abnormality processing portion configured to, after the abnormality determination portion determines that there is abnormality in the data transfer process, prohibit the re-transfer control portion from re-transferring the data, and execute an abnormality process to handle the abnormality.

2. The image forming apparatus according to claim 1, wherein
   the abnormality determination portion determines whether or not there is abnormality in the data transfer process of the data based on related information related to transferring of the data.

3. The image forming apparatus according to claim 2, wherein
   the related information is: a size of the data; or a memory address of a transfer destination of the data, and
   the abnormality determination portion determines that there is abnormality in the data transfer process when the related information is different from a predetermined reference value.

4. The image forming apparatus according to claim 1, wherein
   the consistency determination portion
   compares an inherent value of the data generated before the transfer by the data transfer portion with an inherent value of the data generated after the transfer,
   determines that there is consistency between the data before and after the transfer when the inherent value generated before the transfer matches the inherent value generated after the transfer, and determines that there is no consistency between the data before and after the transfer when the inherent value generated before the transfer does not match the inherent value generated after the transfer.

5. The image forming apparatus according to claim 4, wherein
the inherent value is a checksum of the data.

6. The image forming apparatus according to claim 1, wherein
the consistency determination portion determines whether or not there is consistency between the data before and after the transfer when the data is of a predetermined first type, and does not determine whether or not there is consistency between the data before and after the transfer when the data is of a second type that is different from the first type.

7. The image forming apparatus according to claim 6, wherein
the second processor is configured to control a drive portion by outputting control data to the drive portion, and configured to acquire detection data that represents a detection result of a sensor,
the data of the first type is the control data, and
the data of the second type is the detection data.

8. A data communication method executed in an image forming apparatus that includes a first processor, a second processor, and a data transfer portion connected with the first processor and the second processor via a bus in a communicable manner and configured to execute a data transfer process to transfer data via the bus between a storage medium connected with the bus and the second processor, the data communication method comprising:
a consistency determination step of determining whether or not there is consistency between data before and after a transfer by the data transfer portion;
an abnormality determination step of, after the consistency determination step determines that there is consistency, determining whether or not there is abnormality in the data transfer process of the data;
a re-transfer control step of, after the consistency determination step determines that there is no consistency, causing the data transfer portion to re-transfer the data that is a transfer target; and
an abnormality processing step of, after the abnormality determination step determines that there is abnormality in the data transfer process, prohibiting the re-transfer control step from re-transferring the data, and executing an abnormality process to handle the abnormality.

* * * * *